United States Patent
Bürger

(10) Patent No.: US 6,886,673 B2
(45) Date of Patent: May 3, 2005

(54) GEAR-JUMPING-PROOF POSITIVE-LOCKING CLUTCH

(75) Inventor: Hans Bürger, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/000,431

(22) Filed: Nov. 30, 2001

(65) Prior Publication Data

US 2002/0084164 A1 Jul. 4, 2002

(30) Foreign Application Priority Data

Nov. 30, 2000 (DE) .......................................... 100 59 417

(51) Int. Cl.[7] .......................................... F16H 13/22
(52) U.S. Cl. ................. 192/53.4; 192/53.361; 192/53.363; 74/339
(58) Field of Search ................. 192/53.36, 53.361, 192/53.363, 48.91, 53.4, 114 R; 74/339

(56) References Cited

U.S. PATENT DOCUMENTS

| | | | | |
|---|---|---|---|---|
| 2,735,528 A | * | 2/1956 | Dodge | ..................... 192/48.91 |
| 2,883,020 A | | 4/1959 | Kümmich et al. | |
| 4,108,291 A | | 8/1978 | Zenker | |
| 4,303,151 A | * | 12/1981 | Kolacz | ..................... 192/48.91 |
| 4,782,719 A | | 11/1988 | Yarnell | |
| 5,022,506 A | * | 6/1991 | Philippe | ................. 192/53.361 |
| 5,083,993 A | * | 1/1992 | Oun | ......................... 192/48.91 |
| 5,228,355 A | | 7/1993 | Smith et al. | |
| 5,267,636 A | * | 12/1993 | Fielding | ....................... 74/339 |
| 5,651,435 A | | 7/1997 | Perosky et al. | |
| 5,800,072 A | | 9/1998 | Buch et al. | |
| 6,073,502 A | | 6/2000 | Wallace | |

FOREIGN PATENT DOCUMENTS

| | | |
|---|---|---|
| DE | 1 101 172 | 3/1961 |
| DE | 39 30 173 | 1/1991 |
| DE | 198 39 154 | 6/2000 |
| DE | 199 10 576 | 9/2000 |

* cited by examiner

Primary Examiner—Saul Rodriquez
Assistant Examiner—Eric M. Williams
(74) Attorney, Agent, or Firm—Kenyon & Kenyon

(57) ABSTRACT

In a gear-jumping-proof positive-locking clutch for connecting a vehicle transmission shaft to a transmission component mounted coaxially and rotationally with it, the positive-locking clutch includes an axially displaceable sliding sleeve on which at least one locking roller element may be supported which is displaceable in a radial locking recess with axial displacement of the sliding sleeve due to a radial force component. In a gear-jumping-proof positive-locking clutch which does not cause any transmission noise when disengaged, the positive-locking clutch is free of synchromesh bodies and the locking roller element is axially displaceable.

21 Claims, 5 Drawing Sheets

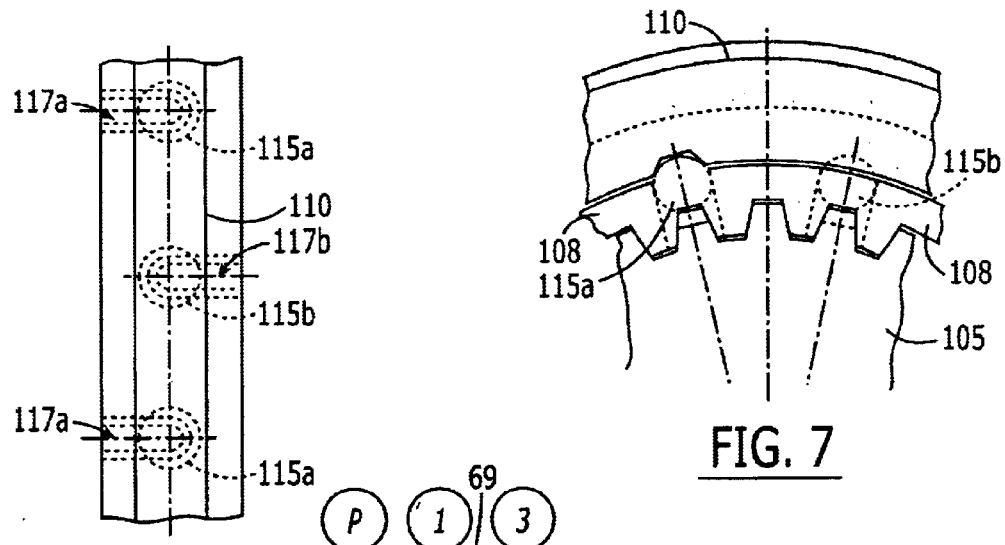
FIG. 6
FIG. 7
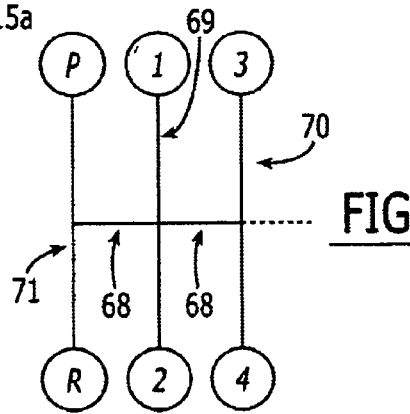
FIG. 8
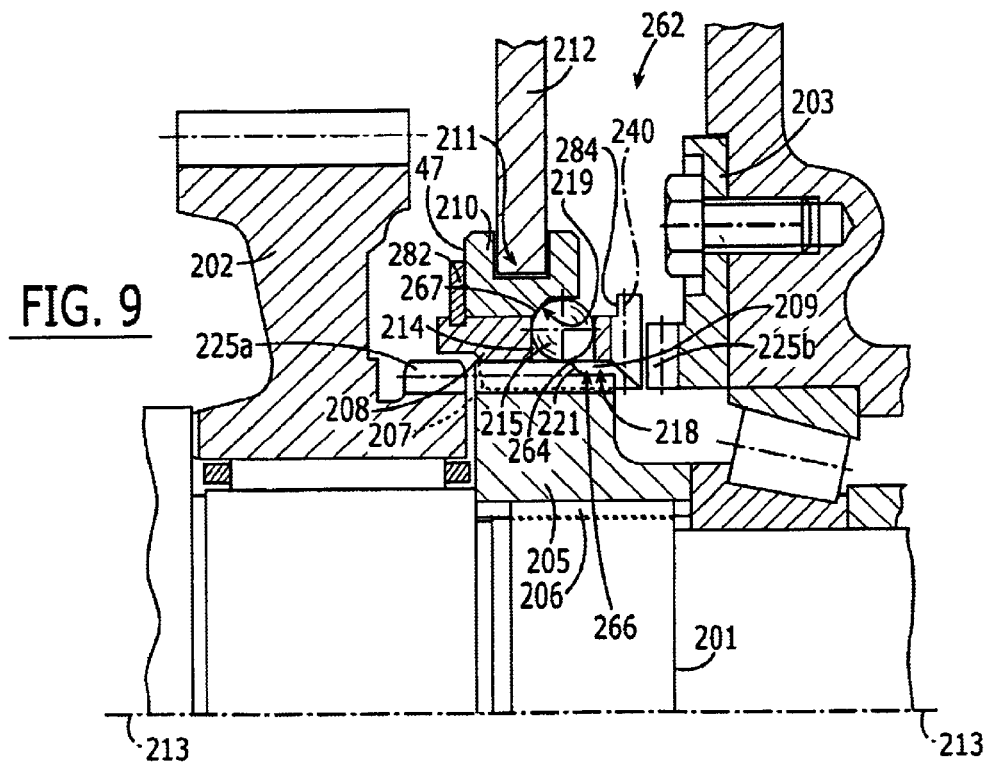
FIG. 9

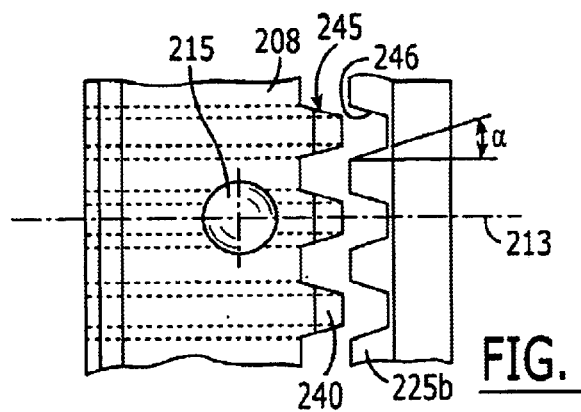
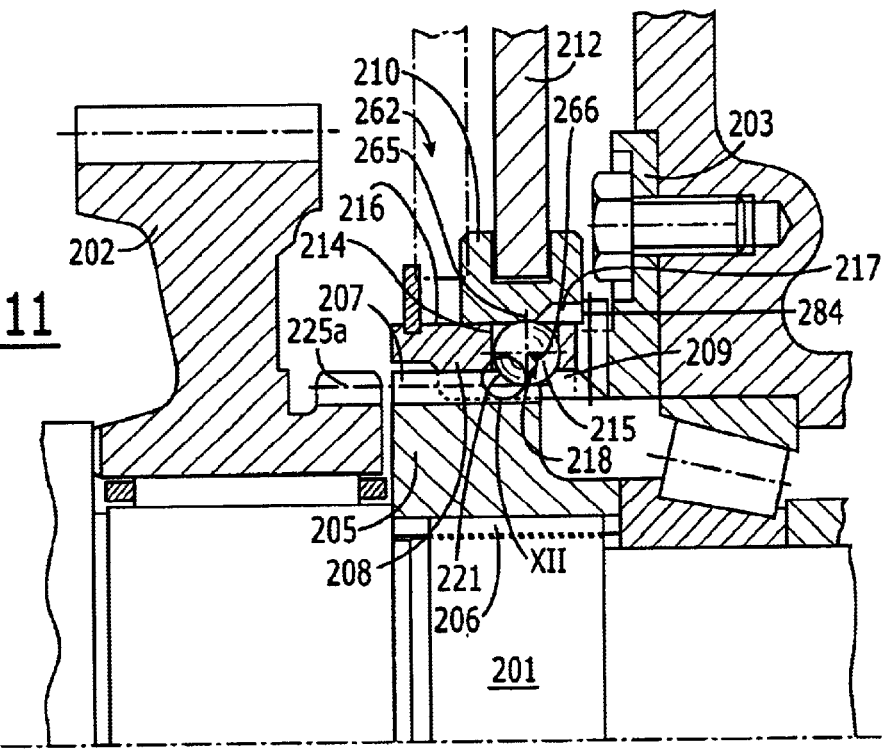
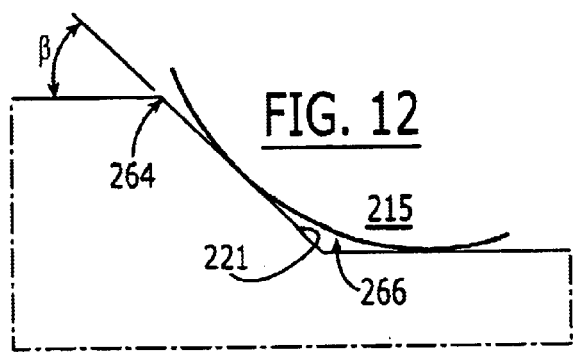

GEAR-JUMPING-PROOF POSITIVE-LOCKING CLUTCH

FIELD OF THE INVENTION

The present invention relates to a gear-jumping-proof positive-locking clutch.

BACKGROUND INFORMATION

Such a gear-jumping-proof positive-locking clutch is described in German Published Patent Application No. 1 101 172. This positive-locking clutch is used to connect a vehicle transmission shaft to an idler pulley rotatably mounted coaxially with the shaft. The positive-locking clutch includes an axially displaceable sliding sleeve having a bevel on which are supported locking balls which, due to a radial force component, can be displaced into radial depressions in the gear wheel with axial displacement of the sliding sleeve. When the positive-locking clutch is disengaged, the locking balls are arranged directly outside the depressions radially, i.e., in the same position axially as when engaged. Due to the resulting constantly present radial mobility of the locking bodies, this unfortunately results in transmission noise, which is perceived as unpleasant by occupants of the vehicle.

Furthermore, German Published Patent Application No. 39 30 173 describes a synchronizer device having a radially displaceable lock.

U.S. Pat. No. 5,651,435 describes a synchronizer unit with which a transmission shaft can be braked against the gearbox.

Furthermore, German Published Patent Application No. 198 39 154 describes a shiftable square-tooth clutch in which the loads on the square teeth in starting up are reduced. With this shiftable square-tooth clutch, one part of the clutch is provided with a spring force-loadable locking pin by which displacement of a locking ball out of a radial recess in a transmission shaft into an outer radial position is prevented when the clutch part is in an intermediate position. In this intermediate position, no torque transmitting connection is established between the second clutch part and an idler pulley to be coupled, i.e., the square-tooth clutch is in the disengaged position.

It is an object of the present invention to provide a gear-jumping-proof positive-locking clutch which does not cause any transmission noise when disengaged.

SUMMARY

The above and other beneficial objects of the present invention are achieved by providing a gear-jumping-proof positive-locking clutch as described herein.

One advantage of the present invention is that the locking roller elements, e.g., locking balls, may be pushed away from the radial recess, e.g., depression, due to an axial displaceability in the disengaged state of the positive-locking clutch without necessarily leaving their position on the periphery. Therefore, chattering of the balls in the axially displaced position is reliably suppressed because freedom of radial movement is no longer required in the area of the depression.

Furthermore, the lack of friction elements for transmission of torque results in a further noise reduction because the transmission chatter typical of synchronous rings is suppressed.

Roller elements of roller bearings may be used as the locking roller elements because they have high-quality material properties and are inexpensive despite the long lifetime associated therewith.

In one example embodiment of the present invention, the forces of inertia, axial forces and impacts on positive-locking clutch parts, e.g., in braking or accelerating the motor vehicle, may not result in disengagement of the positive-locking clutch. Therefore, the locking roller elements are supported primarily in the radial direction on the sliding sleeve when the positive-locking clutch is engaged. Consequently, forces originating from a transmission component to be coupled to the vehicle transmission shaft into the locking roller elements are supported on the sliding sleeve primarily in the radial direction and do not displace it axially due to the self-locking effect or the relatively low axial force component. Thus, the locking effect may be cancelled only by axial forces (or shifting forces) introduced directly into the sliding sleeve. Therefore, the area of contact of the sliding sleeve with the locking roller element extends parallel to the vehicle transmission shaft in the locked state. Thus, no axial forces are introduced from the locking roller element into the sliding sleeve.

In another example embodiment of the present invention, the radial force component for displacement of the locking roller element is established radially inward into the depression by an inexpensively manufactured bevel, e.g., inclined at 45°.

In another example embodiment of the present invention, a synchromesh body is connected in a rotationally fixed manner to the vehicle transmission shaft by a shaft-hub connection. Locking roller elements are arranged on it. This synchromesh body increases the diameter of the positive-locking clutch, so that when it is used, for example, for connection to idler pulleys arranged coaxially with the vehicle transmission shaft, it is possible to overcome the radial installation space which is to be reserved for the installation of the idler pulley. When using the present invention as a parking lock mechanism for locking the vehicle transmission shaft with respect to the gearbox, this makes is possible to overcome the radial installation space to be reserved for the installation of the transmission shaft in the gearbox.

In another example embodiment of the present invention, the locking roller element is guided inside a roller element support which is rotationally fixed and axially displaceable with respect to the vehicle transmission shaft. Thus, the locking roller element is always held in an axial or peripheral position and transmission noise such as chattering of the locking roller elements is largely suppressed. Furthermore, due to the roller element support, a small axial installation space is possible for the positive-locking clutch. The reason for this is the possibility of arranging the locking depression on the axial end of the synchromesh body or a vehicle transmission shaft shoulder without the locking roller element falling out of the positive-locking clutch. Due to the roller element support establishing the rotationally fixed connection between the vehicle transmission shaft and the transmission component, the locking roller elements are entirely free of the function of transmitting torque, which extends their service life.

In another example embodiment of the present invention, the positive connection between the vehicle transmission shaft and the transmission component is established by gearing which is responsible for the rotationally fixed and axially displaceable property of the supporting body with respect to the synchromesh body. Since the gearing thus assumes two different functions, it may have a different configuration on its end areas where the coupling occurs than in its middle area.

Another example embodiment of the present invention includes a parking lock mechanism. In the case of such a parking lock mechanism, the transmission shaft is locked with respect to the gearbox.

End gearing may be provided to connect the vehicle transmission shaft to the gearbox. In the case of such end gearings as a Hirth serration, an engagement angle which ensures that the parking lock mechanism may always be released is selected to avoid a self-locking effect when the parking lock mechanism is engaged, the necessary result being that the parking lock mechanism may not be released on a gradient. A combination with the positive-locking clutch according to the present invention may provide that the necessary axial force due to the inclined top, which increases with the gradient, may not result in the parking lock mechanism being released, regardless of the magnitude of the gradient.

Another example embodiment of the present invention may save axial installation space, where the transmission component fixed on the gearbox receives the bearing ring of the bearing for support of the transmission shaft. Thus, both the transmission component and the bearing ring may be arranged in one plane.

Another example embodiment of the present invention is easy to assemble and saves axial installation space, the bearing ring being provided directly with the gearing for fixed coupling of the vehicle transmission shaft to the gearbox.

Another example embodiment of the present invention is especially short in the axial direction, a single positive-locking clutch being provided for coupling two transmission components. The arrangement of the sliding sleeve between the reverse gear on and a parking lock mechanism may be provided, because with these two transmission components, it is possible to eliminate synchromesh bodies without any sacrifice in comfort.

In another example embodiment of the present invention, both transmission components may be locked.

Another example embodiment of the present invention is especially short in the axial direction, and the locking roller elements are arranged in alternation around the periphery. This arrangement creates the possibility of arranging the locking elements in one plane so that a correlation of one lock with one transmission component may be established entirely without any loss of axial space with respect to an example embodiment of the present invention having just one lockable transmission component.

BRIEF DESCRIPTION OF THE DRAWINGS

FIG. 6 illustrates in the second example embodiment illustrated in FIG. 5 a partial area of the sliding sleeve with the locking roller elements behind it, with the latter being indicated with broken lines like the concealed pan-shaped depressions on the sliding sleeve.

FIG. 7 is a view in direction VII illustrated in FIG. 5 of a sectional plane perpendicular to the longitudinal axis of the transmission shaft and illustrates:
 the sliding sleeve;
 the locking roller elements;
 the roller element support; and
 the synchromesh body;
both the locking roller element assigned to the first transmission component and the locking roller element assigned to the second transmission component being illustrated.

In a third example embodiment, FIG. 8 is a schematic view of a vehicle transmission having a positive-locking clutch arranged between an unsynchronized reverse gear and a parking lock mechanism.

FIG. 9 illustrates a partial area of a vehicle transmission having a positive-locking clutch corresponding to the schematic view illustrated in FIG. 8 in the neutral position.

FIG. 10 illustrates a partial area of the roller element support and a locking ring mounted fixedly on the gearbox illustrated in FIG. 9.

FIG. 11 illustrates the parking lock mechanism illustrated in FIG. 9 in the engaged state, with the original neutral position of the shift fork indicated with dash-dot lines.

FIG. 12 is a detail view of the portion XIII illustrated in FIG. 11.

DETAILED DESCRIPTION

Figure 1:
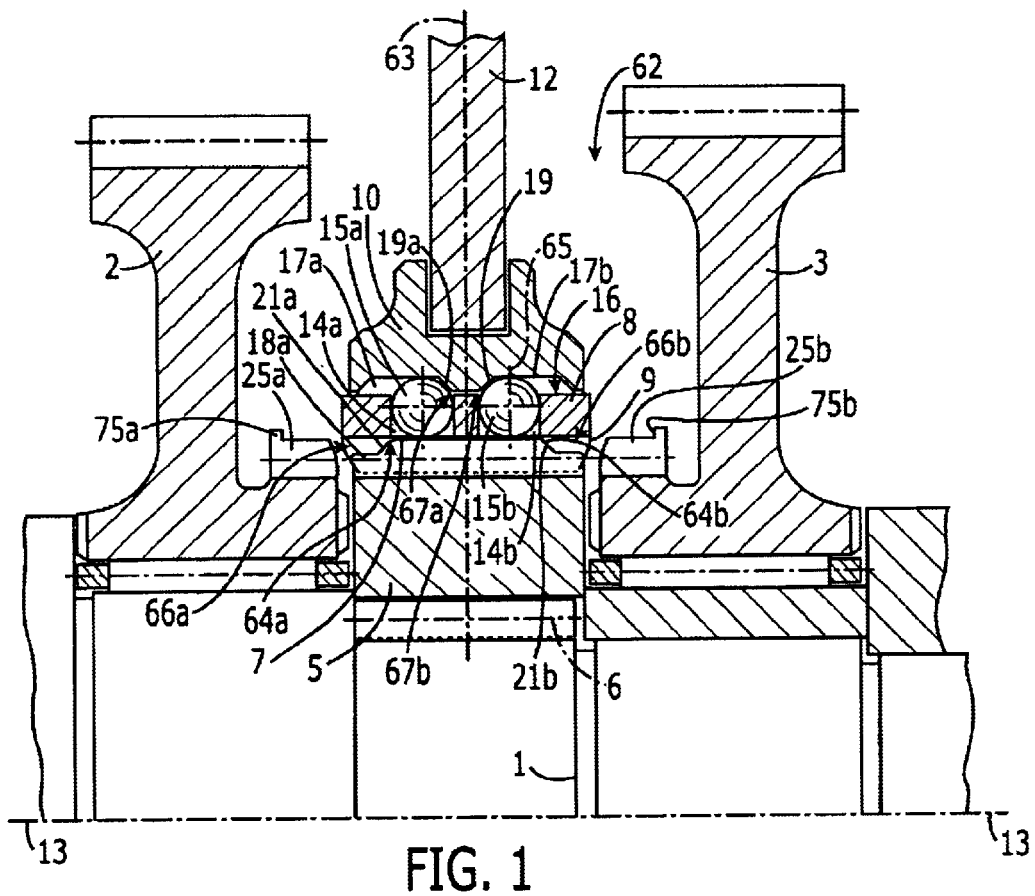
FIG. 1 illustrates a partial area of a vehicle transmission in which a vehicle transmission shaft having idler pulleys is arranged with a positive-locking clutch that may be shifted by a shift fork being arranged between them, this positive-locking clutch being arranged in symmetry with a plane of symmetry and includes:
 a sliding sleeve;
 a locking roller element;
 a roller element support;
 two shift gearings, each assigned to one idler pulley; and
 a synchromesh body;
the positive-locking clutch illustrated in the neutral position.

FIG. 1 illustrates a partial area of a vehicle transmission in which a vehicle transmission shaft 1 is arranged with two idler pulleys 2, 3. A positive-locking clutch 62 which may be shifted by a shift fork 12 is arranged axially between these two idler pulleys 2, 3, this positive-locking clutch 62 being symmetrical with a plane of symmetry 63 and also including:

locking roller elements 15a, 15b, designed as conventional ball bearings;

a roller element support 10;

two shift gearings 25a, 25b, each assigned to one of the two idler pulleys 2, 3; and a synchromesh body 5.

The positive-locking clutch is illustrated in the neutral position in FIG. 1, i.e., it is disengaged with respect to both idler pulleys 2, 3.

A plurality of idler pulleys are arranged so they may rotate by roller bearings coaxially with vehicle transmission shaft 1 of the vehicle transmission in a conventional manner, only two idler pulleys 2, 3 being illustrated here as an example. Synchromesh body 5 is connected to vehicle transmission shaft 1 by a shaft-hub gearing 6 in a rotationally fixed manner in the peripheral direction. Furthermore, synchromesh body 5 is provided with an outer gearing 7 on the periphery extending in the axial direction, engaging with internal gearing 9 on roller element support 8, thus establishing a rotationally fixed but axially displaceable connection. Roller element support 8 is arranged radially inside sliding sleeve 10 which has a concentric ring groove 11 on its outer circumference, engaging with shifter fork 12 which introduces axial forces/displacements in the conventional manner.

Figure 2:
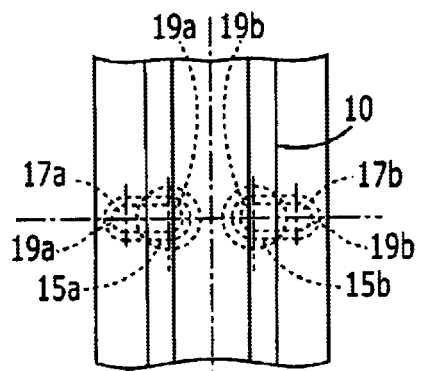
FIG. 2 illustrates a partial area of the sliding sleeve and a locking roller element behind it illustrated FIG. 1, the latter also being indicated with broken lines, like the concealed pan-shaped depressions in the sliding sleeve.
Figure 3:
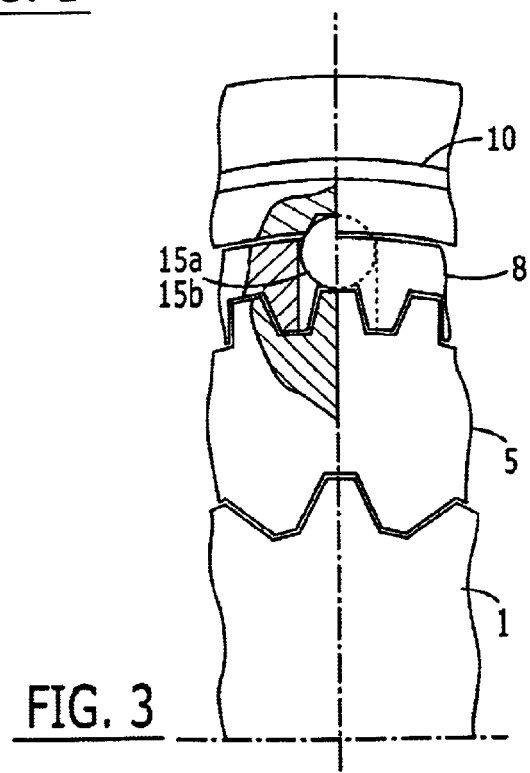
FIG. 3 is a cross-sectional view along a plane perpendicular to the longitudinal axis of the transmission shaft, illustrating:
 the sliding sleeve;
 the locking roller element;
 the roller element support; and
 the synchromesh body;
which are illustrated partially in cross-section to illustrate the functioning of the locking roller elements.

Several continuous bores 14a, 14b extending radially and distributed uniformly around the circumference are provided in roller element support 8, arranged in two axially adjacent planes perpendicular to a transmission shaft axis 13 of vehicle transmission shaft 1. One of two locking roller elements 15a and 15b is arranged so it is guided in these bores 14a, 14b, only two of which are illustrated. Locking roller elements 15a, 15b project radially beyond lateral surface 16b of roller element bracket 8 in the disengaged condition of positive-locking clutch 62 which is illustrated in FIG. 1, thus locking sliding sleeve 10. For this purpose, sliding sleeve 10 has pan-shaped oval recesses 17a, 17b in which the exterior spherical areas of locking roller elements 15a, 15b which project beyond lateral surface 16 engage. Pan-shaped recesses 17a, 17b extend mainly axially as illustrated in detail in FIG. 2. Pan walls 19a, 19b of the two pan-shaped recesses are configured with an inclination.

Two locking roller elements 15a, 15b rest on one tooth of external gearing 7 of synchromesh body 5. On both of its axial ends, this tooth is provided with recesses 66a, 66b, the depth of which corresponds exactly to the radial depth of pan-shaped recesses 17a, 17b. A crown circle of the tooth leads over edges 64a, 64b and bevels 21a, 21b connected to them into recesses 66a, 66b. Bevels 21a, 21b, like pan walls 19a, 19b, form a 45° angle.

The functioning of positive-locking clutch 62 of the first example embodiment is explained below with reference to FIGS. 1 to 4 for the case when vehicle transmission shaft 1 is coupled with idler pulley 3, referred to below as right idler pulley 3 according to the perspective illustrated. The functioning is explained in simplified terms on the basis of only two locking roller elements 15a, 15b as illustrated.

For positive-locking coupling, shift fork 12 is shifted to the right. Sliding sleeve 10, which is supported axially on gear shift 12, is therefore also shifted to the right. Then, due to the support of right locking element body 15b on pan wall 19b, roller element support 8 is also shifted to the right. In this shifting, left locking roller element 15a remains essentially in the same axial position with respect to pan-shaped depression 17a due to its being guided in bore 14a, as long as perpendicular mid-plane 65 of the ball of right locking roller element 15b does not go beyond edge 64b. As soon as this edge 64b has been crossed, locking roller element 15b is shifted radially inwardly. Reactive forces act against locking roller element 15b with this inward displacement:

on a left area of pan wall 19b of right pan-shaped depression 17b; and on bevels 21b of right recess 66b; and on a right wall area of bore 14b of roller element support 8.

Figure 4:
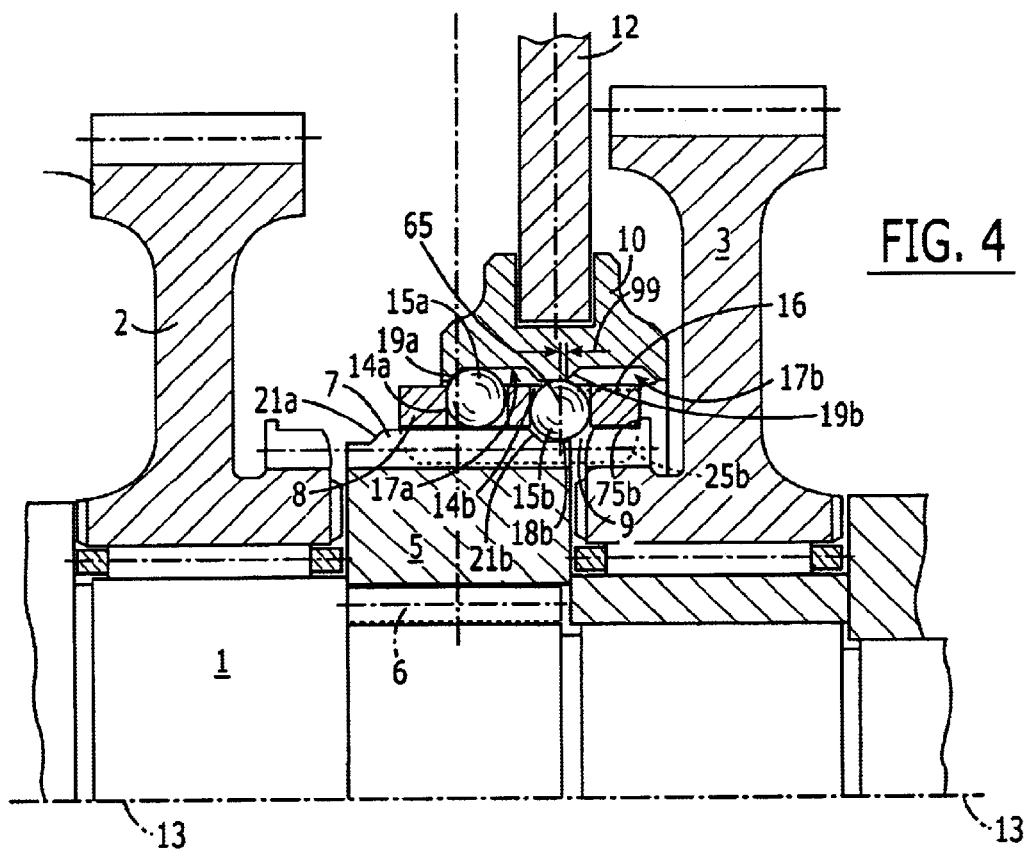
FIG. 4 illustrates the partial area of the vehicle transmission illustrated in FIG. 1, with the positive-locking clutch in an engaged state.

After having reached a locked position in which pan edge 67b axially crosses perpendicular mid-plane 65 of the ball, locking roller element 15b has reached lower recess plane 18b and no longer projects above outer lateral surface 16 of roller element support 8. In this locked position, roller element support 8 comes to rest on a stop 75b of shifting gearings 25b. Sliding sleeve 10 is further displaceable due to right locking roller element 15b which has "dropped." Sliding sleeve 10 is further displaced up to an end position of the sliding sleeve in which a left area of left pan wall 19a comes to rest against left locking roller element 15a. As illustrated in FIG. 4, before this contact of locking roller element 15 with the left area of left pan wall 19a, pan edge 67b is crossed to the right beyond mid-plane 65 of the ball up to an overshoot 99, which is determined by the contact. The contact area of locking roller element 15b with sliding sleeve 10 is in perpendicular mid-plane 65 of the ball. Sliding sleeve 10 is parallel with transmission shaft axle 13 in this contact area. Thus, in the end position of the sliding sleeve, forces may also be transmitted from the locking roller element to sliding sleeve 10 only perpendicularly to transmission shaft axis 13. This reliably prevents external axial forces acting on locking roller element 15b from causing positive-locking clutch 62 to become disengaged.

To release the clutch described here from right idler pulley 3, i.e., to disengage it, sliding sleeve 10 is shifted axially to the left by using the shift fork. After initial displacement of sliding sleeve 10 alone, a right edge area of left pan wall 19a of sliding sleeve 10 strikes against left locking roller element 15a and thus entrains roller element support 8 toward the left. With increasing axial displacement of roller element support 8, right locking roller element 15b thus also rolls radially outward on bevel 21b until edge 64b is again crossed by perpendicular mid-plane 65 of the ball. Following this, sliding sleeve 10 is still displaceable into the neutral position together with roller element support 8 by a slight residual amount.

Both engaging and disengaging of left idler pulley 2 with transmission shaft 1 occur in a similar manner.

Figure 5:
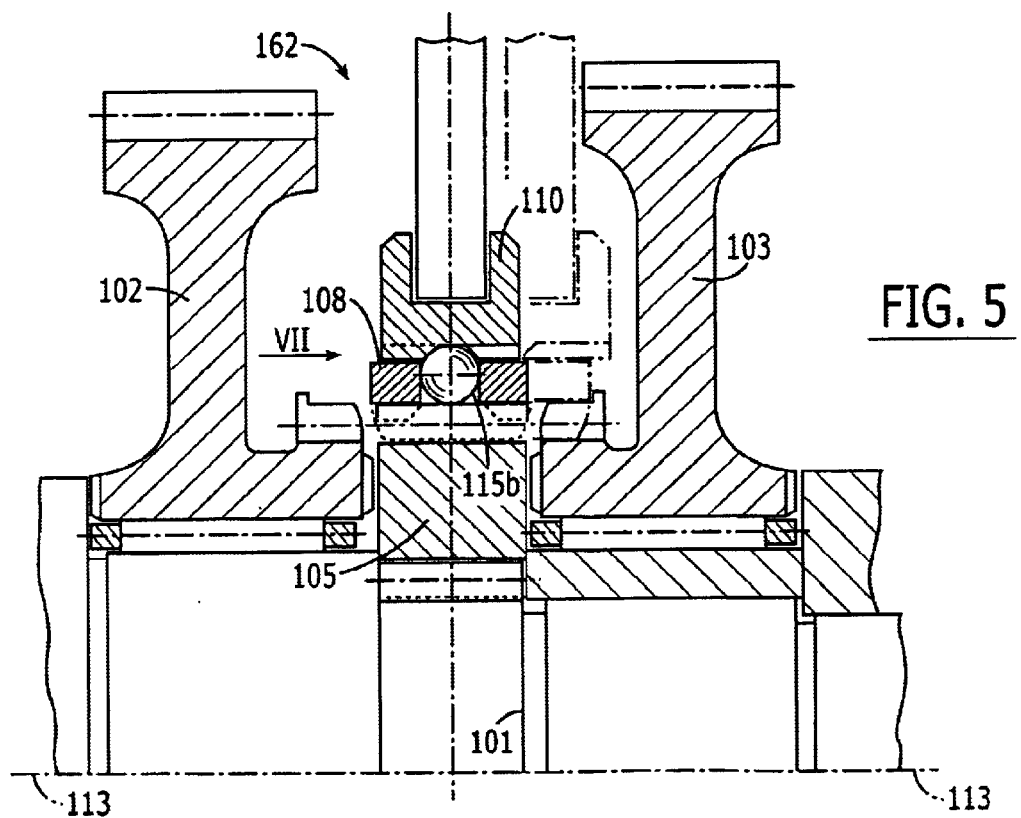
FIG. 5 illustrates a second example embodiment illustrating a partial area of a vehicle transmission having a positive-locking clutch which has an especially short roller element support in the axial direction, the positive-locking clutch being indicated with solid lines in a neutral position and with dash-dot lines in the engaged state.

FIG. 5 illustrates in a second example embodiment a partial area of a vehicle transmission having a positive-locking clutch 162 having a roller element support 108 that is especially short axially. The axially displaceable components of positive-locking clutch 162 are indicated with solid lines in a neutral position and with dash-dot lines in an engaged position, i.e., with the clutch engaged. A few parts which are similar to those described in the first example embodiment are not described in greater detail below. Furthermore, additional parts similar to those in the first example embodiment are provided with reference characters that are increased by 100 in comparison with the reference characters used in the first example embodiment.

FIG. 6 illustrates a partial area of a sliding sleeve 110 and locking roller elements 115a, 115b behind it illustrated in FIG. 1, the latter being indicated with broken lines along with concealed pan-shaped recesses 117a, 117b of sliding sleeve 110. In order to save axial space as illustrated in FIG. 5, both locking roller elements 115a, 115b assigned to locking a left idler pulley 102 as well as those assigned to locking a right idler pulley are arranged in the same plane in the disengaged position. Both sliding sleeve 110 and roller element support 108 as well as a synchromesh body 105 are configured to be shorter axially.

FIG. 7 is a view in direction VII illustrated in FIG. 5 illustrating a sectional plane perpendicular to the longitudinal axis of the transmission shaft, including:

sliding sleeve 110;

locking roller elements 115a, 115b;

roller element support 108; and synchromesh body 105;

also illustrating locking roller element 115a assigned to left idler pulley 102 and locking roller element 115b assigned to right idler pulley 103.

FIG. 8 illustrates in a third example embodiment a schematic view of a parking lock having a positive-locking clutch 262 illustrated in FIG. 9. This view corresponds to the movement sequence followed by a shift lever in manual operation. The view illustrates, in addition to conventional selection path 68, a first shift path 69 for first and second gears and a second shift path 70 for third and fourth gears. Furthermore, this view illustrates a third shift path 71 between park "P" and reverse "R." The shift fork lever is kinematically linked to a shift fork 212 illustrated in FIG. 9 so that movements of the shift fork lever along third shifting channel 71 necessarily lead to axial displacement of shift fork 212.

FIG. 9 illustrates a partial area of a vehicle transmission having positive-locking clutch 262 in a neutral position, i.e., both a first idler pulley 202 assigned to reverse gear "R" and a locking ring 203 assigned to park "p" and rigidly mounted on the gearbox "R" uncoupled from vehicle transmission shaft 201 and may rotate relative to it. Parts similar to those in the first example embodiment are indicated by reference characters that are higher by 200.

Positive-locking clutch 262 which may be shifted by shift fork 212 is arranged axially between idler pulley 202 and locking ring 203, this positive-locking clutch 262 including:

locking roller elements 215 designed as conventional ball bearings;

roller element support 208;

a shift gearing 225a assigned to idler pulley 202 and a case gearing 225b assigned to locking ring 203; and a synchromesh body 205.

A plurality of idler pulleys are arranged so they may rotate by roller bearings coaxially with vehicle transmission shaft 201 of the vehicle transmission having a parking lock mechanism inherent in the transmission, idler pulley 202 which is provided for the reverse gear being illustrated as an example. Synchromesh body 205 is connected in a rotationally fixed manner in the peripheral direction to vehicle transmission shaft 201 by a shaft-hub gearing 206. Furthermore, synchromesh body 205 is provided at the circumference with external gearing 207 which extends in the axial direction and meshes with internal gearing 209 of roller element support 208, thus establishing a rotationally fixed but axially displaceable connection. Roller element support 208 is arranged on the inside radially of sliding sleeve 210 which has a concentric ring groove 211 engaging in the conventional manner with shift fork 212 which initiates axial forces/displacements.

A plurality of bores 214 distributed uniformly around the circumference and extending radially are provided in roller element support 208 and are in a plane perpendicular to a transmission shaft axis 213 of vehicle transmission shaft 201. A locking roller element 215 is guided in these bores 214, only one of which is illustrated. In the neutral position of positive-locking clutch 262 illustrated in FIG. 9, locking roller elements 215 project radially beyond shifting body support 208. Sliding sleeve 210 has a ring groove 217 on its inside, which is open on its side facing locking ring 203. Locking roller elements 215 which project beyond an outer lateral surface 216 of roller element support 208 engage in this ring groove. Locking roller elements 215 are in contact with sliding sleeve 210 in the area of an inclined ring groove wall, i.e., a ring groove bevel 219 of ring groove 217.

Sliding sleeve 210 is supported axially indirectly on roller element support 208 by a locking ring 282 in the direction pointing toward idler pulley 202, i.e., to the left.

The tooth of external gearing 207 on which locking roller element 215 rests is in contact with a bevel 221 which leads into a radial recess 266 via an edge 264.

Roller element support 208 is provided with an end gearing 240 which corresponds to gearbox gearing 225b which is bolted to the gearbox. End gearing 240 and gearbox gearing 225b form a pair of Hirth serrations.

The functioning of positive-locking clutch 262 of the third example embodiment is described below with reference to FIGS. 8 to 12 for the case when parking lock mechanism "P" is engaged from the neutral position. The functioning is explained in simplified terms on the basis of one locking roller element 215 illustrated.

Shift fork 212 is shifted to the right for positive-locking clutching or engagement of parking lock mechanism "P." Sliding sleeve 210 which is supported axially on shift fork 212 is consequently also shifted to the right. Due to the support of locking roller element 215 on ring groove bevel 219, roller element support 208 is then also shifted to the right. As soon as edge 264 which is illustrated in greater detail in FIG. 12, is crossed by a ball mid-plane 265 of locking roller element 215, locking element 215 is shifted radially inwardly. With this inward shift, reactive forces act on locking roller element 215:

on ring groove bevel 219 of ring groove 217; and on bevel 221 of recess 266; and on a right bore wall area of roller element support 208.

Depending on the angle of ring groove bevel 219 or bevel 221, support element 208 begins to lag somewhat behind the displacement of sliding sleeve 210. After a locked position in which ring groove edge 267 crosses over perpendicular mid-plane 265 of the ball, locking roller element 215 has reached a lower plane 218 of the depression and no longer projects above outer lateral surface 216 of supporting body 208. After reaching this locked position of roller element support 208 in which a stop end position of end gearing 240 has been reached, there is only a slight displacement of sliding sleeve 210 to a sliding sleeve end position. In this sliding sleeve end position, sliding sleeve 210 comes to rest against a rear stop 284 arranged radially on the outside of end gearing 240.

Contact of end gearing 240 with gearbox gearing 225b is associated with a high force arising from the static torque, such as that which occurs in parking on a gradient, for example. Tooth flanks 245 and 246 are configured with a tooth angle $\alpha$ which is greater than a self-locking angle, thus reliably preventing jamming due to the support of the high torque. An axial reactive force which depends on the coefficient of friction between tooth flanks 245 and 246 and occurs due to the force arising from the static torque or tooth angle α and acts constantly when parking lock mechanism "P" is engaged does not lead to disengagement of positive-locking clutch 262 due to the lock. Disengagement of positive-locking clutch 262 is impossible because locking roller element 215 applies a normal force to sliding sleeve 210 in the radial direction due to an angle β of tooth 221. This normal force is incapable of displacing the sliding sleeve in the axial direction.

In alternative arrangements of the third example embodiment illustrated in FIGS. 8 to 12, the stop end position of the end gearing may be accomplished by contact of the tooth flanks or by contact of tip and root diameter planes of the end gearing.

Figure 13:
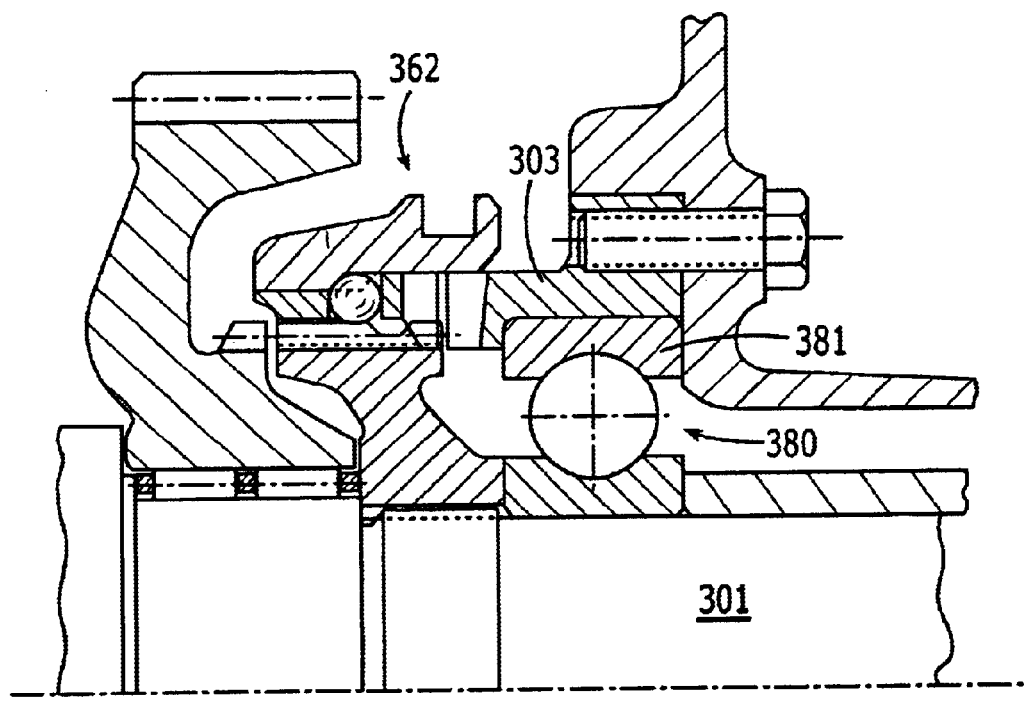
FIG. 13 in a fourth example embodiment illustrates a partial area of a vehicle transmission having a parking lock mechanism with a positive-locking clutch in neutral position, a locking ring fixedly mounted on the gearbox receiving the bearing outer race of a bearing of the vehicle transmission shaft.

FIG. 13 illustrates in a fourth example embodiment a partial area of a vehicle transmission having a parking lock mechanism which is engaged by a positive-locking clutch 362. In contrast with the third example embodiment, a bearing outer race 381 of a roller bearing 380 of transmission shaft 301 is accommodated directly in a locking ring 303 which is immovably bolted to a gearbox.

Figure 14:
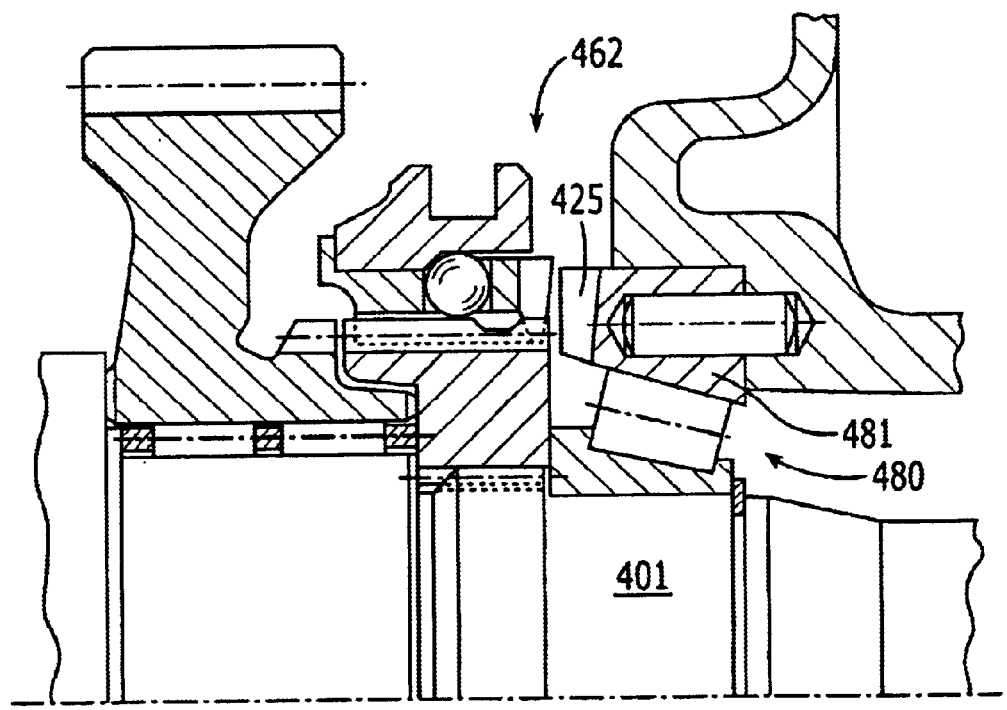
FIG. 14 in a fifth example embodiment illustrates a partial area of a vehicle transmission having a parking lock mechanism with a positive-locking clutch in neutral position, a locking ring fixedly mounted on the gearbox forming the bearing outer race of a tapered roller bearing of the vehicle transmission shaft.

FIG. 14 illustrates in a fifth example embodiment a partial area of a vehicle transmission having a parking lock mechanism which is engaged by a positive-locking clutch 462.

A gearing 425 is brought directly onto an end face of a bearing outer race 481 of a tapered roller bearing 480 of transmission shaft 401. Bearing outer race 481 is pinned immovably to the gearbox. The bearing outer race forms an angle which opens toward the inside of the gearbox, so that the axial force component acting on bearing outer race 481 constantly presses bearing outer race 481 against an axial contact surface of the gearbox.

In another example embodiment of the present invention, in order to-lock the positive-locking clutch in an engaged position only one ball is provided. Furthermore, in other example embodiments, any desired number of locking roller elements may be provided for locking in which case they are arranged symmetrically on the perimeter or in the case of an even number they may be arranged in diametric opposition to prevent tilting movements of the three components:
synchromesh body;
roller element support; and
sliding sleeve.

The locking roller elements may also be configured as cylindrical rollers or as barrel-shaped elements, for example.

In other example embodiments of the present invention, rocker arms are used instead of shift forks.

In other variants of the third example embodiment, the parking lock mechanism is operated with a shift fork assigned to a different gear than reverse gear. Depending on the type of shift actuators, among other things, the parking lock mechanism is engaged and disengaged by a final controller element assigned exclusively to it.

In other example embodiments, the pan walls or the bevels leading into the radial recesses have angles other than 45°.

In other example embodiments of the present invention, the bevel of the recess or the pan wall of the pan-shaped recess is configured as a concave or convex curve.

In another example embodiment, instead of the pan-shaped recess, a ring-shaped peripheral bevel is worked in the sliding sleeve. Furthermore, the sliding sleeve may also have any desired shapes, as long as they permit displaceability with respect to the roller element support and the synchromesh body in introducing a radial force component into the locking roller element. Shapes of the sliding sleeve which permit rotatability of the sliding sleeve with respect to the vehicle transmission shaft as well as shapes which permit a rotationally fixed but axially displaceable guidance with respect to the transmission shaft and the support body are possible.

The example embodiments described are merely examples of possible embodiments. A combination of the features described for different embodiments is also possible. Other features of the device parts belonging to the present invention, in particular features that are not described, may be derived from the geometric relationships of the device parts as illustrated in the Figures.

What is claimed is:

1. A gear-jumping-proof positive-locking clutch configured to connect a motor-vehicle transmission shaft to a transmission component mounted coaxially and rotatably with respect to the transmission shaft, comprising:
   at least one axially displaceable locking roller element; and
   an axially displaceable sliding sleeve configured to support the at least one locking roller element;
   wherein the at least one locking roller element is displaceable into a radial locking recess located in at least one axial end of a transmission shaft shoulder in accordance with a radial force component with axial displacement of the sliding sleeve, the locking roller element located in the locking recess at a time of establishment of the connection between the vehicle transmission shaft and the transmission component, the positive-locking clutch being free of synchromesh bodies.

2. The positive-locking clutch according to claim 1, wherein the transmission component includes one of an idler gear and a locking ring.

3. The positive-locking clutch according to claim 1, wherein the locking roller element is supported primarily in a radial direction on the sliding sleeve in an engaged state of the positive-locking clutch.

4. The positive-locking clutch according to claim 1, wherein the sliding sleeve includes an inclined area configured to introduce the radial force component into the locking roller element.

5. The positive-locking clutch according to claim 1, further comprising a roller element support rotationally fixed and axially displaceable with respect to the vehicle transmission shaft, the locking roller element guidable inside the roller element support.

6. The positive-locking clutch according to claim 5, wherein the transmission component is arranged fixedly on a gearbox.

7. The positive-locking clutch according to claim 6, wherein the transmission component includes an end gearing corresponding to an end gearing of the roller element support.

8. The positive-locking clutch according to claim 6, wherein the transmission component accommodates a bearing ring of a bearing of the vehicle transmission shaft.

9. The positive-locking clutch according to claim 6, wherein the transmission component is configured in one piece with a bearing ring that supports the vehicle transmission shaft.

10. The positive-locking clutch according to claim 1, wherein the positive-locking clutch is arranged axially between a first transmission component and a second transmission component.

11. The positive-locking clutch according to claim 10, wherein at least one locking roller element is provided for each of the transmission components.

12. The positive-locking clutch according to claim 11, wherein the locking roller elements corresponding to the first transmission components are arranged alternatingly with the locking roller elements corresponding to the second transmission component.

13. The positive-locking clutch according to claim 1, wherein the transmission shaft shoulder comprises a locking recesses on each axial end.

14. The positive-locking clutch according to claim 13, wherein at least one locking roller element is always between the locking recesses.

15. The positive-locking clutch according to claim 13, wherein at least two locking roller elements are between the locking recesses at a time when the vehicle transmission shaft and the transmission component are not connected.

16. A gear-jumping-proof positive-locking clutch configured to connect a motor-vehicle transmission shaft to a transmission component mounted coaxially and rotatably with respect to the transmission shaft, comprising:

at least one axially displaceable locking roller element; and an axially displaceable sliding sleeve configured to support the at least one locking roller element;

wherein the at least one locking roller element is displaceable into a radial locking recess in an axial end of a synchromesh body in accordance with a radial force component with axial displacement of the sliding sleeve, the locking roller element located in the locking recess at a time of establishment of the connection between the vehicle transmission shaft and the transmission component;

wherein the locking roller element is configured to roll on the synchromesh body connected in a rotationally fixed manner to the vehicle transmission shaft by a shaft-hub connection.

17. The positive-locking clutch according to claim 16, further comprising a roller element support rotationally fixed and axially displaceable with respect to the vehicle transmission shaft, the locking roller element guidable inside the roller element support.

18. The positive-locking clutch according to claim 16, wherein the transmission shaft shoulder comprises a locking recesses on each axial end.

19. The positive-locking clutch according to claim 18, wherein at least one locking roller element is always between the locking recesses.

20. The positive-locking clutch according to claim 18, wherein at least two locking roller elements are between the locking recesses at a time when the vehicle transmission shaft and the transmission component are not connected.

21. A gear-jumping-proof positive-locking clutch configured to connect a motor-vehicle transmission shaft to a transmission component mounted coaxially and rotatably with respect to the transmission shaft, comprising:

at least one axially displaceable locking roller element; and an axially displaceable sliding sleeve configured to support the at least one locking roller element;

wherein the at least one locking roller element is displaceable into a radial locking recess in accordance with a radial force component with axial displacement of the sliding sleeve, the locking roller element located in the locking recess at a time of establishment of the connection between the vehicle transmission shaft and the transmission component, the positive-locking clutch being free of synchromesh bodies;

wherein a roller element support is rotationally fixed and axially displaceable with respect to the vehicle transmission shaft, the locking roller element guidable inside the roller element support;

wherein the roller element support includes an axially aligned support gearing constantly engaging a shaft gearing arranged in a rotationally fixed manner with respect to the vehicle transmission shaft, the support gearing in a disengaged state rotatable with respect to the transmission component and, in an axially displaced and clutched state of the positive-locking clutch, engaged in a gearing of the transmission component; and wherein the support gearing comprises a radial locking recess in at least one axial end.

* * * * *

UNITED STATES PATENT AND TRADEMARK OFFICE
CERTIFICATE OF CORRECTION

PATENT NO. : 6,886,673 B2
APPLICATION NO. : 10/000431
DATED : May 3, 2005
INVENTOR(S) : Buerger Page 1 of 1

It is certified that error appears in the above-identified patent and that said Letters Patent is hereby corrected as shown below:

Column 2,
Line 46, change "makes is possible" to -- makes it possible --;

Column 7,
Line 36, change "assigned to park "p"" to -- assigned to park "P" --; and Column 9,
Line 34, change "in order to-lock" to -- in order to lock --.

Signed and Sealed this

Twentieth Day of June, 2006

JON W. DUDAS
*Director of the United States Patent and Trademark Office*